(12) United States Patent
Tan et al.

(10) Patent No.: US 11,443,125 B2
(45) Date of Patent: Sep. 13, 2022

(54) UBIQUITOUS WASTE MANAGEMENT SYSTEM

(71) Applicant: Terra Phoenix Sdn. Bhd., Selangor (MY)

(72) Inventors: Ching Seong Tan, Kuala Lumpur (MY); Hin Yong Wong, Kuala Lumpur (MY); Erfan Hajimohammadhosseinmemar, Yerevan (AM); Tien Sing Au Yong, Selangor (MY)

(73) Assignee: Terra Phoenix Sdn. Bhd., Selangor (MY)

( * ) Notice: Subject to any disclaimer, the term of this patent is extended or adjusted under 35 U.S.C. 154(b) by 0 days.

(21) Appl. No.: 16/593,643

(22) Filed: Oct. 4, 2019

(65) Prior Publication Data
US 2020/0110917 A1      Apr. 9, 2020

(30) Foreign Application Priority Data
Oct. 5, 2018   (MY) .................... MYPI2018001704

(51) Int. Cl.
*G06K 7/10* (2006.01)
*G06F 21/60* (2013.01)

(52) U.S. Cl.
CPC ....... *G06K 7/10366* (2013.01); *G06F 21/602* (2013.01)

(58) Field of Classification Search
CPC .................................................. G06K 7/10366
USPC ......................................................... 235/451
See application file for complete search history.

(56) References Cited

U.S. PATENT DOCUMENTS

| | | | | |
|---|---|---|---|---|
| 8,318,047 B2 * | 11/2012 | Furumura | ........ | G06K 19/07749 235/492 |
| 2014/0263674 A1 * | 9/2014 | Cerveny | .......... | G06K 19/06037 235/494 |
| 2015/0324760 A1 * | 11/2015 | Borowski | ............. | B65F 1/1426 705/308 |
| 2018/0272540 A1 * | 9/2018 | Cronin | .................... | H04W 4/38 |

* cited by examiner

*Primary Examiner* — Rafferty D Kelly
(74) *Attorney, Agent, or Firm* — Head, Johnson, Kachigian & Wilkinson, PC

(57) ABSTRACT

A waste management system comprising a garbage bin for receiving rubbish and acting as a collection (14) point, an application used to notify a rubbish collector that the rubbish is ready for collection (14), the application being associated with an individual and wirelessly connected to a server, characterized in that identification means are provided to enable the application to track the route of the collected rubbish through one or more stages as the rubbish is transferred from the collection (14) point to a disposal point.

12 Claims, 1 Drawing Sheet

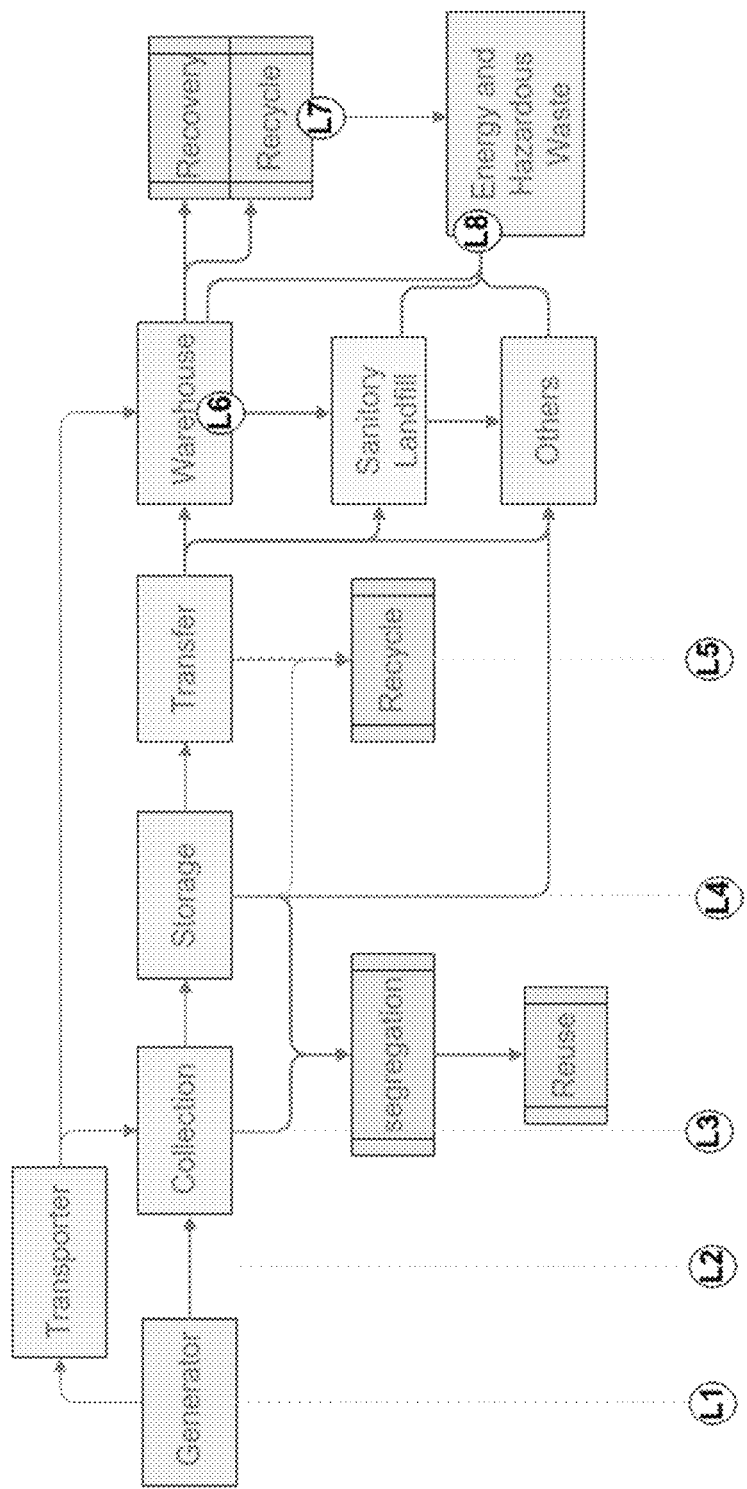

UBIQUITOUS WASTE MANAGEMENT SYSTEM

CROSS-REFERENCE TO RELATED APPLICATIONS

This application claims priority to Malaysian Patent Application No. MYPI2018001704, filed Oct. 5, 2018, which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to a ubiquitous waste management system.

Background

Waste management is the process of treating waste materials and offers a variety of solutions for recycling items. There are 8 major groups of waste management methods. These groups include source reduction and reuse, landfill, recycling, composting, incineration, animal feeding, fermentation and land application. Today, recycling is a commonly used method for waste disposal in most developed countries. The idea of the recycling method is to convert waste products into new products in order to reduce energy usage and consumption of fresh raw materials.

At present, advanced waste management systems are using technologies such as QR codes and infrared scanners to increase the efficiency of the garbage collection system. According to CN 105173477, a garbage bin can be equipped with a delivery infrared scanner that helps to scan the information of the waste materials in the garbage bag and sends feedback stimulus information to a cloud module. It has a feature that helps with the sorting guidance, automatic classification, error correction and delivery reward to raise awareness of waste.

Another example of prior art describes a smart hopper provided with a scanning function for a two-dimensional code which is also known as a QR code. The inner cover of the hopper has an inbuilt integrated chip which is connected to the QR code scanning module.

It appears that QR code or infrared scanner functions integrated in a smart hopper or garbage bin are known technologies that are being used in waste management systems.

However, one of the problems with this technology is the question of accuracy when it comes to tracking disposal behaviors and rewarding/penalty points to an individual. Besides that, this technology is unable to detect the owner of the waste materials when it ends up at the final stage (e.g. landfill). Data that was encrypted from the QR code and infrared scanner does not appear to link it to a specific individual as bins are shared, and thus this does not necessarily ensure that the right individual is credited with points for the waste. This may lead to deterrence for an individual to throw their rubbish responsibly. In addition, the costs to use technology such as QR code and infrared scanner in the waste management system are reasonably high. Hence, most developing countries might not be able to afford to use such technology as it is too costly.

Aiming for a better environment by reducing the usage of energy and consumption of fresh raw materials should be a priority whereby even undeveloped countries are able to join in the process of recycling.

An aim of the invention is to provide waste management system which overcomes the above issues.

SUMMARY OF INVENTION

In an aspect of the invention there is provided a waste management system comprising:
  a collection point at which rubbish is received;
  an application used to notify a rubbish collector that the rubbish is ready for collection;
  the application being associated with an individual and wirelessly connected to a server;
  characterized in that identification means are provided to enable the application to track the route of the collected rubbish through one or more stages as the rubbish is transferred from the collection point to a disposal point.

In one embodiment, the identification means comprises radio frequency identification (RFID) chip powder sprinkled into a garbage bag into which the rubbish is placed.

Typically, an automatic scanner is provided at one or more stages to scan the garbage bags containing the RFID chip powder.

In one embodiment, the identification means also includes one or more cameras for generating at least one image of the rubbish. Typically, image processing means is provided at one or more stages to scan rubbish. The images are correlated in feature trees that enable learning and deep learning. These features form the identity of the particular disposal.

All features extracted from a given image shall be linked to form a feature tree of the image. The feature tree is unique and therefore represents the identity or fingerprint of the image taken. The feature trees may be formed by analysing an image (e.g. 1 mega pixel) for criteria such as vertices, colour areas, hue, saturation and intensity, together with RFID data, location data and relationships between the features. Each feature tree is represented as a string i.e. a unique fingerprint associated with the image of the rubbish, and which can be tracked through the system, along the flow of the waste collection and transfer stages (i.e. L1 to L8) using similarity matching.

In one embodiment, the identification means also includes any or any combination of QR codes (which may be a two-dimensional image of 100 pixels by 100 pixels, for example), Bar codes, hand written physical size measurements (i.e. height, length, width), and/or the like. Each of these may also be included as a feature in the feature tree.

Advantageously, the data from the identification means are analysed to enable the rubbish to be associated with the individual. A server links rubbish to the individual by fuzzy matching the data provided by the identification means to the data provided at the later stages received from the scanner or image processing means, etc.

In one embodiment, an application is provided on the individual's mobile device. The mobile device of the rubbish collector and the mobile device of the generator (i.e, the individual) can be linked upon the transfer of the waste from the generator to the collector. This hand over enables the data of the generator and the waste to be transferred down to the subsequent stages for correlation and tracking.

Typically, the application provided on the mobile device enables the users to track their rubbish location, the user identity, the feature set of the identity of the disposal, the disposal time by retrieving the corresponding data from the server.

At each stage of the tracking, the user data are protected by means of encryption. No one in the process of the transfer shall be allowed to view the user information while it is transferred between stages.

Advantageously, when rubbish is thrown by the user, the server provides an appropriate credit/penalty to the user and the application on the mobile device allows the user to view their reward/penalty points.

In a further embodiment the individual can be identified and flagged when the rubbish is classified as illegal or abnormal. When an individual is flagged in this way the authorities may be alerted to review the data and check the rubbish discarded by the user, so that appropriate action may be taken. It will be appreciated that one or more of the identification means may be used to classify the rubbish.

In one embodiment, there are eight or more stages in the waste management system where rubbish can be tracked. Advantageously this allows different processes and stages of the system to be reviewed more easily.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

FIG. 1 illustrates a flow chart showing the 8 stages or layers of data tracking in a ubiquitous waste management system according to an embodiment of the invention.

DETAILED DESCRIPTION

According to the present invention, there are 8 layers of data tracking that helps to increase the efficiency, accuracy and security in a waste management system. The system of data tracking commences from the garbage bin in each household. A waste generator (12) such as an individual with a mobile application (in the present invention this is called Phinonic) connects with a wireless connection to a server and uses the mobile application to automatically notify the rubbish collector (14) of the location of the user and that the rubbish is ready for collection (in Phinonic this would be by clicking the iDrop button). At each layer of data tracking, a single means or method as well as a combination of methods (RFID powder, camera images, QR code, barcode, weight, sizes, or hand written messages) with the corresponding reader/scanner can be used to provide data at each layer. The data generated in each layer are accumulated along the transference of waste from one stage to another stage. It is correlated later to form the relationship and flow of the particular user-waste tracking in a greatest likelihood approach.

For example, each individual or household is given radio frequency identification (RFID) chip powder or droplet that works as an identification means to be sprinkled on their garbage bag in the garbage bin before clicking the iDrop function on the mobile application.

Besides the usage of RFID chip powder technology, camera imaging can also be used as an alternative identification means. A camera is inbuilt on the garbage bin to capture images of the rubbish and/or the user.

Both of these identification means can be used to identify the user and ensures the right individual is credited with points for the waste. The mobile application enables the user's identification data to be extracted conveniently from the user's device. The identification (using face recognition, thumb print or any bio-information) can be linked to the location and disposal identification data (from RFID or camera images). Similar identification means can also be used in this application, such as barcode, QR code, physical dimension (length, width and height, weight) on the disposed items or packing. The information is transferred with encryption of personal data to the next device that is used by the collector. The collector can be a container, or a vehicle or a storage that collects the waste from the generator/user.

At each layer of the data, the user information shall be linked to the disposal at each stage using one or the combination of the above methods.

The generator and/or the application then requests collection of the rubbish by a transporter. The location data and collector information is recorded and tracked as data layer L2 while the transporter is moving towards the rubbish location. The identification is similar to the above methods.

Once the rubbish transporter arrives at the user's location, the rubbish transporter scans the garbage using the said mobile application and the rubbish bag is transferred from the generator (L1) to the transporter. The location (16) is typically a collection point where the generator gathers enough rubbish to pass to the transporter.

The data from the RFID chip powder and/or camera image identification is then saved in the mobile application system. The data may be encrypted for security and/or privacy reasons. In the Phinonic application, the transporter clicks on the iPickUp function on the mobile application, generating data layer L3. Based on the data that is being stored in the mobile application system, the user will either be assigned with points or penalty.

Alternatively, the generator may choose to go directly from their location to the storage bin (18). The server shall detect the generator's action by using the location data when the generator press iDROP button that is at the bin location or that the bin QR code or identity is scanned. At the storage bin, data layer L4 is generated.

Once they are scanned, the garbage bags are then brought to the warehouse (16) by the rubbish transporter using a prebuilt conveyor/piping or a vehicle such as a van or truck wherein the transferring of garbage bags from the vehicle to the warehouse occurs.

The extracted data is automatically stored in the system and eases the process entering data manually, speeding up the segregation processes. In the warehouse, the process of segregation (28) takes place whereby the collected rubbish is transferred to the segregation site and segregated into categories such as reusable (30), recyclables (32) and others (24).

Alternatively, and/or in addition, the data may be transferred using long-range low-power wireless technology such as Long Range Communication (LoRa). The LoRa system uses lower operating costs by automating metering, control and monitoring infrastructure, and offers new services such as parking availability and reservations.

Reuse (30) can be a conventional reuse of material, wherein products are put to their original use, again or a creative reuse, in which the items are utilized to serve a different function. Further, when we reuse something, it adds to its function and also lengthens the product's life.

As for recycling (32), it is the process in which an item or its components are used to create something new. Recycling is technically a form of reusing, but it refers more specifically to items that are broken down into raw materials.

Waste that isn't segregated (28) during the collection from the transporter is transferred to a storage location (L4). The transporter may choose to transfer directly to warehouse facilities (20) or a transfer channel (prebuilt conveyor, piping, or vehicle) (19) for subsequent transfer (L7) to the waste diversion section for further segregation and transfer (L8) to sanitary landfill (22), or transfer to energy and hazardous waste treatment (26) (if appropriate) or others (24). Transfers to the energy and hazardous waste treatment helps reduce the consumption of raw materials, pollution, energy use and the volume of the waste that must be treated and disposed of.

Throughout the process of the collection of the rubbish from the user's location to the warehouse, users are able to track their rubbish location using the mobile application. An automatic scanner is integrated at the entrance of the warehouse (16) whereby the garbage bags containing the RFID chip powders are scanned when being transferred from the mobile unit to the warehouse. The information that was scanned is then uploaded to the server. This enables the user to view the location of their respective garbage bags.

A camera image identification system may also be integrated at the entrance of the warehouse. The camera takes several snapshots of the rubbish in the garbage bags, stores the image data in the system and then an algorithm is run to try identify the user of the garbage bag by comparing the data received from the warehouse with the data received from the users. If a number of items are thrown away by a user, the algorithm detects the pattern of such items at the warehouse to determine the user's identity.

It will be appreciated by persons skilled in the art that the present invention may also include further additional modifications made to the system which does not affect the overall functioning of the system.

The invention claimed is:

1. A waste management system comprising:
a collection (14) point at which rubbish is received;
an application used to notify a rubbish collector that the rubbish is ready for collection (14);
the application being associated with an individual and wirelessly connected to a server;
identification means including one or more cameras for generating at least one image of the rubbish and the individual;
said identification means are provided at a plurality of stages to enable the application to identify the individual to ensure the right individual is credited with points for the rubbish and to track the route of the collected rubbish through said stages as the rubbish is transferred from the collection (14) point to a final disposal point such as landfill;
characterized in that each image of the rubbish is analyzed to extract features which are linked to form a feature tree of said image represented as a string, said string being tracked through said plurality of stages using similarity matching.

2. A system according to claim 1, wherein the identification means comprises radio frequency identification (RFID) chip powder sprinkled into a garbage bag into which the rubbish is placed.

3. A system according to claim 2, wherein an automatic scanner is provided at one or more stages to scan the garbage bags containing the RFID chip powders.

4. A system according to claim 1, wherein the identification means further includes weight, size, dimensions, QR code, barcode, hand written message, and/or the like.

5. A system according to claim 1, wherein data from the identification means is analysed to enable the rubbish to be associated with the individual.

6. A system according to claim 5, wherein the application is provided on the individual's mobile device.

7. A system according to claim 5, wherein the application on the mobile device enables the users to track their rubbish location.

8. A system according to claim 5, wherein rubbish thrown by the user provides a credit or penalty to the user and the application on the mobile device allows the user to view their credits.

9. A system according to claim 5, wherein the individual can be identified and flagged when the rubbish is classified as illegal or abnormal.

10. A system according to claim 1, wherein there are eight or more stages in the waste management system where rubbish can be tracked.

11. A system according to claim 1, wherein device stations are provided to scan and detect the identity and signature of the waste items.

12. A system according to claim 1 wherein user and/or waste data is encrypted.

* * * * *